United States Patent [19]

Tsuboi et al.

[11] Patent Number: 4,841,514
[45] Date of Patent: Jun. 20, 1989

[54] OPTICAL RECORDING METHOD AND APPARATUS USING TWO FIGHT SPOTS

[75] Inventors: Nobuyoshi Tsuboi, Ibaraki; Atsumi Watanabe, Hitachi; Yoshio Sato, Hitachi; Satoshi Shimada, Hitachi; Hiroshi Sasaki, Hitachi, all of Japan

[73] Assignee: Hitachi, Ltd., Tokyo, Japan

[21] Appl. No.: 919,421

[22] Filed: Oct. 16, 1986

[30] Foreign Application Priority Data

Oct. 16, 1985 [JP] Japan .................................. 60-228775

[51] Int. Cl.⁴ .............................................. G11B 7/00
[52] U.S. Cl. ...................................... 369/100; 369/44
[58] Field of Search ................. 365/100, 116, 112, 13; 346/76 L

[56] References Cited

U.S. PATENT DOCUMENTS

| | | | |
|---|---|---|---|
| 4,383,261 | 5/1983 | Goldberg | 369/46 L |
| 4,530,080 | 7/1985 | Aoi et al. | 369/45 |
| 4,566,088 | 1/1986 | Yoshida et al. | 369/116 |
| 4,679,184 | 7/1987 | Yoshida . | |
| 4,710,911 | 12/1987 | Yamada et al. | 369/100 |

FOREIGN PATENT DOCUMENTS

| | | | |
|---|---|---|---|
| 56-162691 | 12/1981 | Japan | 369/100 |
| 58-83347 | 5/1983 | Japan | 369/13 |
| 59-68844 | 4/1984 | Japan . | |
| 2110406 | 6/1983 | United Kingdom | 369/100 |

OTHER PUBLICATIONS

Proceedings of Japan Display; 1983, pp. 40-48 "Erasable Optical Disc Using TEOy Thin Film"; Yamada et al., English translation of JP 56-162691 pp. 1-16 attached with JP document.

*Primary Examiner*—Aristotelis M. Psitss
*Attorney, Agent, or Firm*—Antonelli, Terry & Wands

[57] ABSTRACT

A light spot determining a first condition that an optical recording medium is cooled after being heated to a temperature exceeding a first temperature and a light spot determining a second condition that the optical recording medium is cooled after being heated to a temperature exceeding a second temperature higher than the room temperature and not exceeding the first temperature higher than the second temperature, namely, the two light spots are radiated onto the optical recording medium and in the same guide track thereof wherein signals are recorded and erased on the optical recording medium by controlling the spot diameter of each light spot and/or the light intensity thereof.

13 Claims, 5 Drawing Sheets

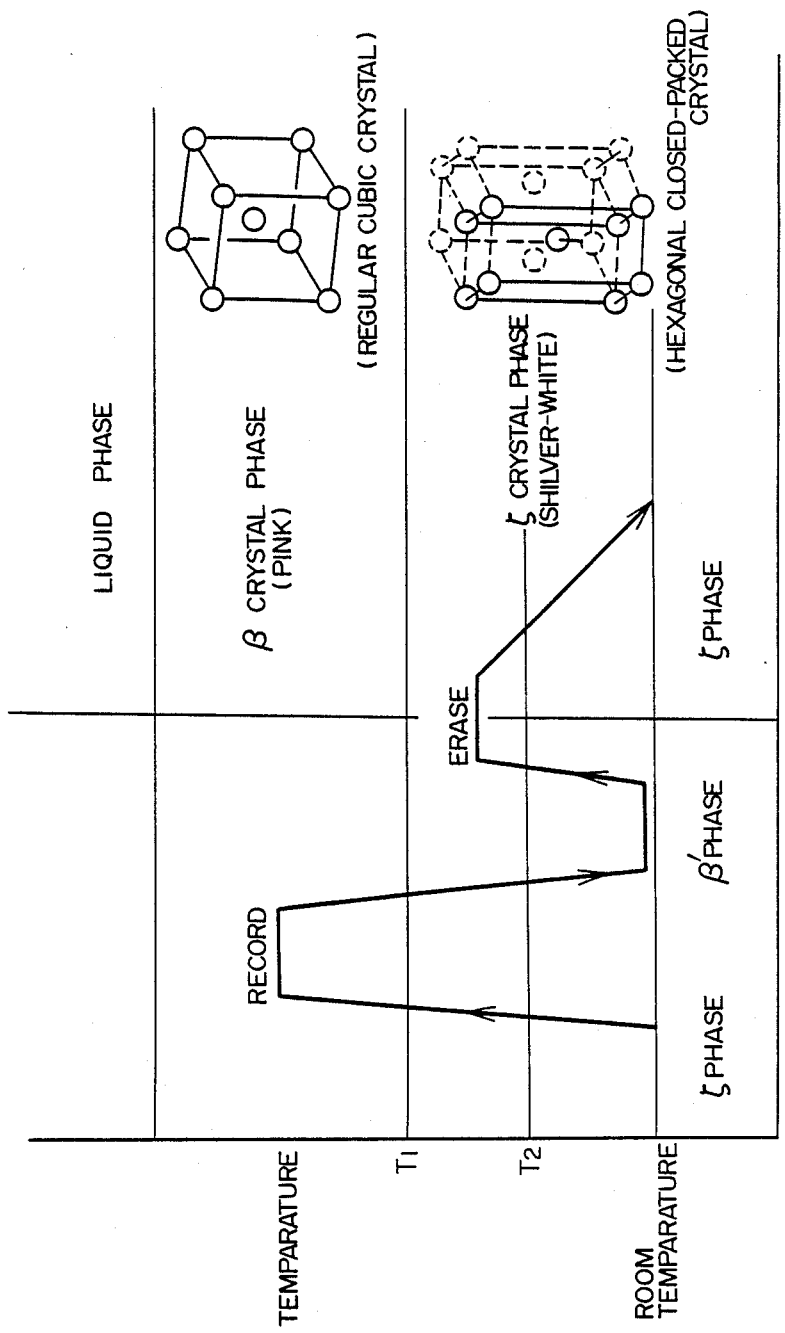

OPTICAL RECORDING METHOD AND APPARATUS USING TWO FIGHT SPOTS

BACKGROUND OF THE INVENTION

The present invention relates to an optical recording method and an apparatus using the method, and in particular, to an optical recording method and an apparatus using the method suitable for utilizing an optical recording medium in which a signal is recorded according to a fact that when a light spot is radiated on a location of the optical recording medium, an optical characteristic of the medium changed because the temperature at the location is increased.

As described in the JP-A- No. 59-68844, an apparatus in which a laser light is collected to form a laser beam having a very small diameter of about 1 μm and is radiated, for example, onto a rotating optical recording disk coated with a photosensitive recording material so as to record signals at a high density and to reproduce the recorded signals has such advantages that due to a high recording density, the memory cost per bit can be lowered, that a high-speed access is possible, and that the optical head and the optical recording disk are not brought into contact with each other during the recording and playback operations and hence the reliability of the optical recording disk and the optical recording apparatus can be improved, and therefore the apparatus has been considered to provide new recording apparatus and medium to the information-oriented society in the future.

As recording media applicable to the optical recording, there have been proposed, for example, a medium having a thin recording film which is evaporated by the thermal energy of a laser light to form small holes in the thin film and a medium having a thin recording film of which the optical density is changed by use of the thermal energy of a laser light.

In addition, for the recording thin film in which the optical density is changed, it has been reported that the optical density can be reversibly changed by use of an amorphous thin film. The fact that the optical density can be reversibly changed means that a signal can be recorded, reproduced, and erased; however, the recording thin film made of an amorphous material is substantially unstable, namely, the crystallization of the amorphous material proceeds also in the room temperature and hence such a thin film is not suitable for storing the recorded data for a long period of time. Moreover, Te, Se, and Sn are used to increase the recording sensitivity; however, these materials have a harmful influence on a human body, and when the thin film is manufactured conducted, there is a possibility that a problem of contamination may arise. In addition, the high recording sensitivity means that the thin film is susceptible to influences of the temperature, light, and the like, which leads to a problem of retension for keeping the recorded data.

As an optical recording medium, an alloy has been developed in which a phase change is effected between two different crystal states and the information recording and erasure can be achieved by use of the difference of optical reflection factor between these crystals. This alloy is described in the JP-A- No. 60-186825 and JP-A- No. 61-9542.

For the recording media capable of a high-density recording, a high-speed recording function is especially required to record the increasing amount of information.

SUMMARY OF THE INVENTION

It is therefore an object of the present invention to provide an optical recording method and an apparatus using the method in which information can be recorded at a high speed.

Another object of the present invention is to provide an optical recording method and an apparatus using the method in which information can be erased and recorded again at a high speed.

Another object of the present invention is to provide an optical recording method and an apparatus using the method in which a recording operation to achieve a high-temperature heating and a high-speed cooling and an erasing operation to perform a heating and a slow cooling can be easily effected.

According to an embodiment of the present invention, a recording location of an optical recording medium is preheated to a temperature not reaching a predetermined temperature necessary for a recording and the location is heated up to a temperature exceeding the predetermined temperature according to a recording information, thereby recording the, information. In more detail, two light spots located in the neighborhood of each other are radiated along a recording track on an optical recording medium in which the preceding light spot preheats a location and the succeeding light spot records an information thereat.

According to another embodiment of the present invention, an optical recording medium is used in which a recording operation is performed by heating the recording medium to a temperature equal to or more than a first temperature and an erasing operation is achieved by heating the recording medium to a temperature between the first temperature and a second temperature exceeding the first temperature wherein two light spots located in the vicinity of each other are radiated along a recording track on the optical recording medium so that a preceding spot thereof heats a recording location to a temperature between the first temperature and the second temperature, thereby erasing a recorded information and preheating the location at the same time and a succeeding spot thereof heats the location to a temperature not less than the first temperature according to an information to be recorded, thereby recording the information.

According to still another embodiment of the present invention, a second temperature is set to exceed the room temperature and a first temperature is set to exceed the second temperature wherein a first light spot determining a first condition under which an optical recording medium heated to a temperature exceeding the first temperature is cooled and a second light spot determining a second condition under which the optical recording medium heated to a temperature exceeding the second temperature and not exceeding the first temperature is cooled are radiated on a guide track of the optical recording medium so as to be located in the neighborhood of each other, so that a signal is recorded and erased on the optical recording medium by controlling the diameter of each light spot and/or the light intensity thereof. In more detail, based on the temperature and time experimentally confirmed to be required to cause the phase change which leads to a change of the optical reflection factor, as means for determining the first and second conditions, two laser units having the different wavelengths are provided; and the optical system is configured such that a beam radiated from one of these laser units results in a just focus and a beam from the other unit produces a defocus condition. The diameter of each spot and the intensity of each laser beam are controlled so that the recording medium is preheated or slowly cooled by use of the defocus spot and the predetermined temperature is developed by use of the just focus spot, thereby recording a signal on the recording medium or erasing a recorded signal.

BRIEF DESCRIPTION OF THE DRAWINGS

The present invention will be apparent from the following detailed description taken in conjunction with the accompanying drawings in which:

FIG. 2 is an explanatory diagram for explaining the fundamental principle for recording and erasing data on an optical disk;

DESCRIPTION OF THE PREFERRED EMBODIMENT

FIG. 2 shows the principle of the recording and erasing by use of the phase change in which when the first temperature $T_1$ is exceeded, the $\beta$ crystal phase appears and the color changes to pink. When the temperature is rapidly lowered to the room temperature the $\beta'$ crystal phase which is the same crystal structure as the $\beta$ crystal phase appears and it is retained. The temperature is increased to exceed the second temperature $T_2$ and not to exceed the first temperature $T_1$ to change the $\beta$ phase into the $\zeta$ crystal phase and then the temperature is decreased to the room temperature, as a result, the $\zeta$ crystal phase is retained and the color changes to silver-white. The crystal developing the colors of pink and silver-white has the different reflection factor for the laser light having, for example, a wavelength of 830 nm. That is, when a certain amount of light is radiated onto the crystal, the amount of the reflected light is changed and hence the $\beta'$ crystal phase and the $\zeta$ crystal phase can be discriminated.

Figure 1:
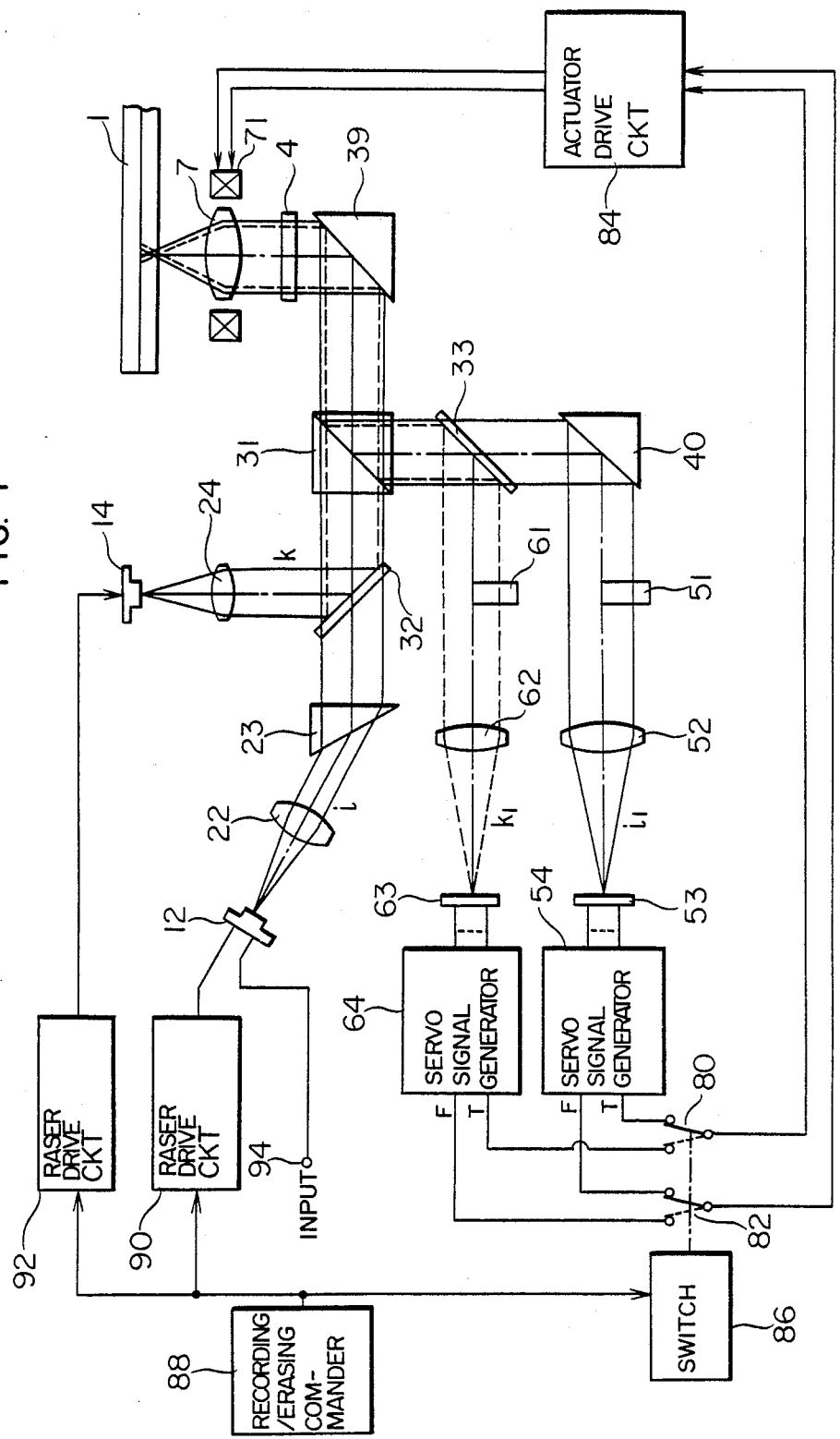
FIG. 1 is a schematic diagram illustrating an embodiment of the present invention.

The present invention relates to an optical recording method and an apparatus using the method suitable when an optical recording medium developing such a phase change is used. FIG. 1 shows an embodiment of the apparatus in which lights diverged from semiconductor laser units 12 and 14 having the different wavelengths are passed through collimate lenses 22 nd 24 so as to obtain substantially parallel lights i and k. Two different wavelengths are used to prevent an interference from occurring between two light beams and to separate the two light beams, thereby enabling the beams to be detected. For example, the wavelengths of the lasers 12 and 14 may be 780 nm and 830 nm, respectively. Let us assume here that the semiconductor laser 12 is utilized for the recording and reproducing operations and that the laser 14 is utilized for the erasing operation. Since the parallel light i is used for the recording operation, the light is shaped to set the ratio of the longitudinal length to the transversal length of the cross section of the beam to be substantially 1 by use of a first prism 23, so that a circular light spot is formed on a disk 1. A wavelength separation filter 32 passes therethrough the light having the wavelength of the semiconductor laser 12 and reflects the light having the wavelength of the semiconductor laser 14. A p-polarized beam contained in the beam from the prism 23 passes through a polarized beam splitter 31 and is transmitted via a mirror 39 and a ¼-wavelength plate 4 so as to be focused by an objective 7, thereby forming on the disk 1 the light spot i which has a substantially circular shape. The substantially parallel light k is reflected by the wavelength separation filter 32; thereafter, the light is transferred in the same way as for the light i. However, the light spot k has not been passed through a prism for shaping a beam, and hence an ellipse of the far field pattern of the laser beam in reduced with the shape unchanged and the resultant light spot is of an elliptic shape having a longer dimension along a direction of the track. The light reflected on the disk 1 is reflected on the objective 7, the ¼-wavelength plate 4, and the mirror 39. Since the reflected beam passes the ¼-wavelength plate two times, namely, in a direction and in another direction opposing thereto, an S-polarized light results. The S-polarized light is then reflected on the polarized light beam splitter 31. The reflected light is split by a wavelength separation filter 33 into a beam $k_1$ and a beam $i_1$, which beam 1, then passes the wavelength filter 33 and is reflected on a mirror 40; and the resultant light passes through a Foukault prism 51 and a lens 52 to reach a light detector 53. The Foukault prism 51 focuses a light spot on the light detector, the light spot including a focusing light spot having a semicircle shape and a tracking spot on the sides thereof. According to the state of the focused image of the light detector 53, a servo signal generator 54 generates a servo signal F for the focusing and a servo signal T for the tracking. These servo signals pass change-over switches 80 and 82 and are then amplified by an actuator circuit 84, and then the obtained signal is supplied to an actuator 71, which is thus activated to achieve the focusing and the tracking of the objective 7.

On the other hand, the beam $k_1$ is reflected by the wavelength separation filter 33 and passes through a Foukault lens 61 and a detection lens 62 to reach a light detector 63, and hence a servo signal generator 64 generates the servo signals for the focusing and the tracking of the objective 7. As described above, the objective 7 is driven to control the focusing and the tracking through the change-over switches 80 and 82, the actuator drive circuit 84, and the actuator 71. The two servo signals are alternatively selected through a switching operation of the switch change-over device 86 to change over the change-over switches 80 and 82. By a recording/erasing commander 88 activated by an operator, the switch change-over device 86 selects the servo signal generator 54 for the recording and selects the servo signal generator 64 for the erasing. When the recording/erasing commander 88 in driven, laser drive circuits 90 and 92 both generate drive signals to drive the semiconductor lasers 12 and 14. For the recording, emission of the semiconductor laser 12 is, controlled according to an information inputted from a recording information source 94 so as to be recorded.

The objective 7 is designed to be placed at one of two positions and the positions can be selected by use of a servo mechanism including the servo signal generators 54 and 64, the actuator drive circuit 84, and the actuator 71.

The beams k and i are substantially parallel lights having almost the same intensity; however, the lens system is configured such that one of these beams is slightly divergent and the other one thereof is slightly convergent. The objective 7 is adapted to be able to be located into two positions. At one position of the objective 7, one of the beams k and i is focused to form a minimum spot and the other beam is defocused to form an obscure spot, and at the other position of the objective 7, the focusing of the spot is reversed. Consequently, when the objective 7 is located at a position to set the spot i to the just focus, the change-over switches 80 and 82 are changed over as indicated with the solid lines; whereas, when the objective 7 is located at a position to set the spot k to the just focus, the change-over switches 80 and 82 are changed over as indicated with the dotted lines.

Figure 3A:
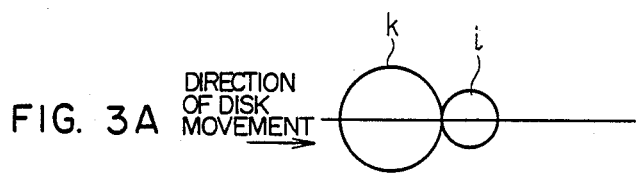
FIGS. 3A–6C are diagrams illustrating operations to record and to erase information in an apparatus according to the present invention.
Figure 3B:
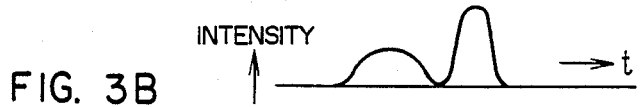
Figure 3C:
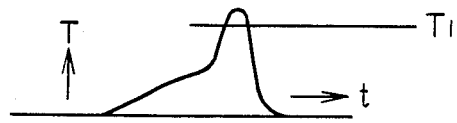

According to this embodiment, for the recording operation, a position where the spot k becomes greater than spot i and the spot i is focused to form a minimum area is selected for the recording operation by use of the mechanism described above. FIGS. 3A–3B show the positional relationships of the spots on the disk and the change of intensity with respect to time of the light radiated on to a pit position to be accessed, respectively. In this diagram, however, the lasers 12 and 14 have almost the same outputs, and hence the maximum value of the energy density of the spot k having a larger diameter is less than that of the energy density of the spot i focused to a point in the vicinity of the diffraction limit. A temperature T at a point (pit position) on a disk which rotates according to the intensity change of FIG. 3B varies with respect to time t as shown in FIG. 3C. Namely, in this case, the spot k preheats the pit position to be accessed to a temperature exceeding the temperature $T_2$ and not exceeding the temperature $T_1$ so as to minimize the time required for the recording spot i to heat the pit position so that the temperature T thereof exceeds $T_1$. This preheating operation functions to enable a high-speed recording. A relatively wide range is preheated due to a large diameter of the preheating spot k; consequently, even if there exists a heat dissipation in the preheated range, the temperature of the pit position can be retained at the required temperature until the pit position is radiated by the spot i. Although the spot k and i are adjacent to each other in FIG. 3A, the location thereof are slightly separated from each other so that the characteristic of the temperature change of FIG. 3C is developed. Setting of T between the temperatures $T_1$ and $T_2$ and setting of T to a temperature equal to or more than the temperature $T_1$ are achieved dependently on the outputs of the semiconductor lasers, the diameters of the spots, and the disk rotary frequency. These values are set according to the empirical rules based on the results of experiments.

Figure 4A:
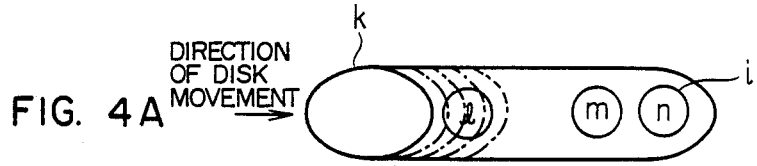
Figure 4B:
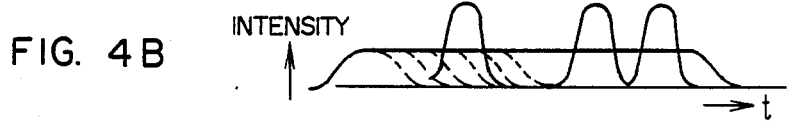
Figure 4C:
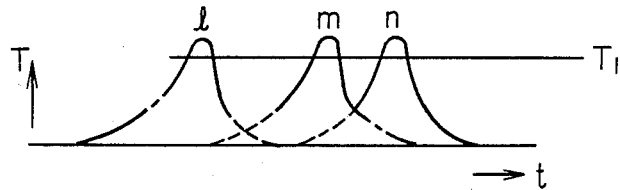

FIG. 4A is a schematic diagram illustrating a case where the beam k also has a larger diameter and is continuously radiated during the recording operation and the beam i having a smaller diameter is radiated only onto the recording pit positions l, m, and n. FIGS. 4B–4C show the intensity change of the beam i and the change of temperature T at the pit position, respectively. In this case, the spot k is not turned on and off for each pit, namely, the preheating operation is successively performed for several recording signals. As described above, a recording portion is preheated by the preceding beam k and the recording positions are heated by the succeeding beam i to a temperature equal to or more than the first temperature $T_1$, which enables to effect the recording when the optical recording medium is rotating at a high speed and further the recording width of the spot i can be reduced or a small spot i can be used due to the effect of the preheating by the spot k. As a result, with the conventional high-density recording being enabled, the access time in a sense of a memory is improved and the speed of the signals to be recorded or reproduced in the realtime fashion can be increased. In general, to enable a recording at a high peripheral speed, the selection of materials and the configuration of media are improved to increase the recording sensitivity of the recording medium; however, the high recording sensitivity means that the recording medium is susceptible to the influences from the temperature, light, and the like, which leads to a problem of the retention of recorded data to be stored. Consequently, the method of the present invention in which a portion to be subjected to a recording is temporarily heated, when a recording is desired, to increase the recording sensitivity of the recording medium has also an effect that the stability of the recorded data is improved.

The recording method as described above in which the recording medium is first preheated and is then recorded is not restricted by the recording media developing a phase change from the $\zeta$ crystal phase to the $\beta$ crystal phase but this method is also applicable to a recording medium which develops a phase change from the crystal phase to the amorphous phase or which enables to form small holes.

Figure 5A:
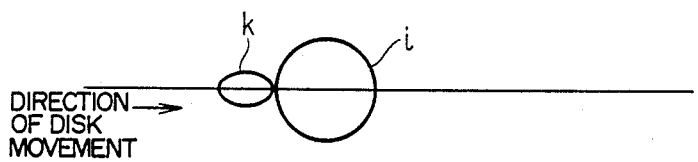
Figure 5B:
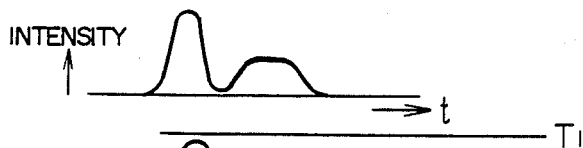
Figure 5C:
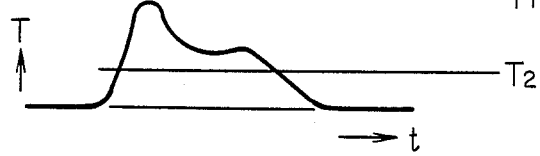

Following the case of the recording operation, a case of erasing operation will be next described. FIG. 5A is a schematic diagram illustrating a case where the focus control is effected to set the spot of beam k to the minimum size. In this case, as described above, the spot of beam i is defocused and hence the diameter of the spot becomes greater. When these beams k and i are radiated on the rotating optical recording medium, the intensity change and the temperature change at the pit position on the disk are as shown in FIGS. 5B and 5C, respectively. Namely, the beam k heats the associated pit to a temperature exceeding the second temperature $T_2$ and not exceeding the first temperature $T_1$ and the time to slowly cool down the pit is reserved by use of the beam i having the expanded spot, thereby erasing the information recorded on the recording medium. In this case, the corresponding pit may be kept heated by the beam i to a temperature between the temperatures $T_1$ and $T_2$ Since the beam i heats a wide range, the corresponding pit portion has a large amount of remaining heat, which ensures the slow cooling.

Although the temperature condition at the pit portion can be obtained also when the semiconductor lasers 12 and 14 supply the constant outputs for the recording and erasing, it is favorable for the optimum temperature condition that the outputs from the lasers 12 and 14 are varied by changing over the outputs from the laser drive circuits 90 and 92 according to an instruction from the recording/erasing commander 88.

Figure 6A:
Figure 6B:
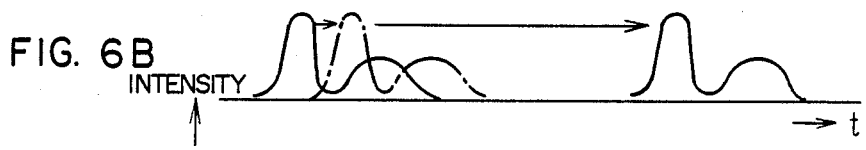
Figure 6C:
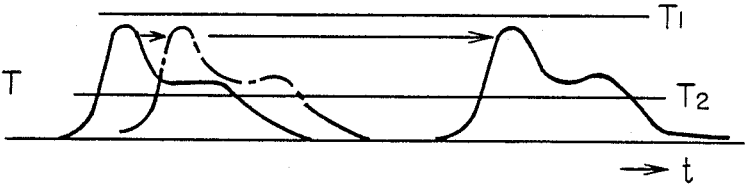

FIG. 6 is a schematic diagram illustrating a case where the beams k and i which are the same or those of FIG. 5 are continuously radiated and the information can be successively erased on a track.

By use of a spot k of which the cross section is expanded in the same way as that illustrated in FIGS. 4A–4C, a recording track is continuously heated to a temperature between the temperatures $T_1$ and $T_2$, thereby erasing by the heating operation the information already recorded in the track; moreover, by applying the similar preheating at the same time, the recording can be effected by the succeeding spot i according to the information to be recorded.

In the recording and erasing operations illustrated in FIGS. 3-6, the spot diameter of each beam is changed to set the energy density of the radiated lights and hence the heating temperature. However, together with the operation to change the spot diameter, the preceding beam k may supply the corresponding pit, for example, with a maximum energy which heats the pit to a temperature below $T_1$ for the recording (defocus state) and erasing (just focus state), so that the temperature of a position irradiated with the beam i exceeds $T_1$ for the recording and that the beam i is kept staying below for the erasing by changing the output from the laser 12 by use of the laser drive circuit 90, thereby further improving the operational characteristic.

According to the present invention as described above, the objective 7 is controlled by the actuator 71 in such a fashion that the preceding beam spot k has a larger size and the beam spot i is focused to form a small dimension to an extent near the diffraction limit. The signal from the detector 53 or 63 of FIG. 1 may be used to control the objective 7. However, when using the defocus side, an offset must be supplied to the focus signal as will be described later.

Figure 7:
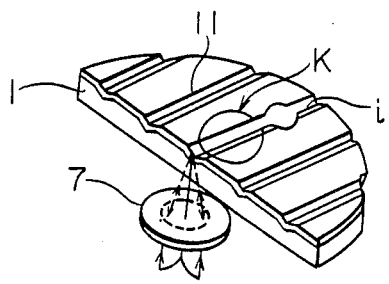
FIG. 7 is a diagram showing an example of a pit disposed in a disk.

As shown in FIG. 7, the optical disk 1 is provided with a guide pit 11 in advance for a high-density recording. For example, a tracking is achieved to track the pit 11 by detecting the light diffracted by the pit 11. In the tracking operation, an error of a light spot with respect to the track can be detected with a higher sensitivity when the servo control is accomplished by use of the detector 53 or 63 and the servo signal generator 54 or 64 on the just focus side. Consequently, the tracking can be achieved with a minimized error by using a small spot light as the tracking detection signal, namely, the spot i and the spot k are used for the recording and the erasing, respectively. For the reproducing operation, since the recorded bits are read by use of a spot which is naturally focused to an extent near the diffraction limit, the detection signal for the tracking is also obtained on the small spot side. On the other hand, to detect a signal for the focus servo by use of the detectors 53 and 63, the conventional four-partition sensor using the astigmatism is utilized, for example. If the difference between two summation signals each obtained by adding the signals from two partitions of the sensor is within a range developing a linear relationship, either one of the spots may be used by supplying an offset to the servo circuit; however, the focus error can be further minimized by using the small spot side where the diffraction phenomenon due to the pit as described above is reduced.

Figure 8:
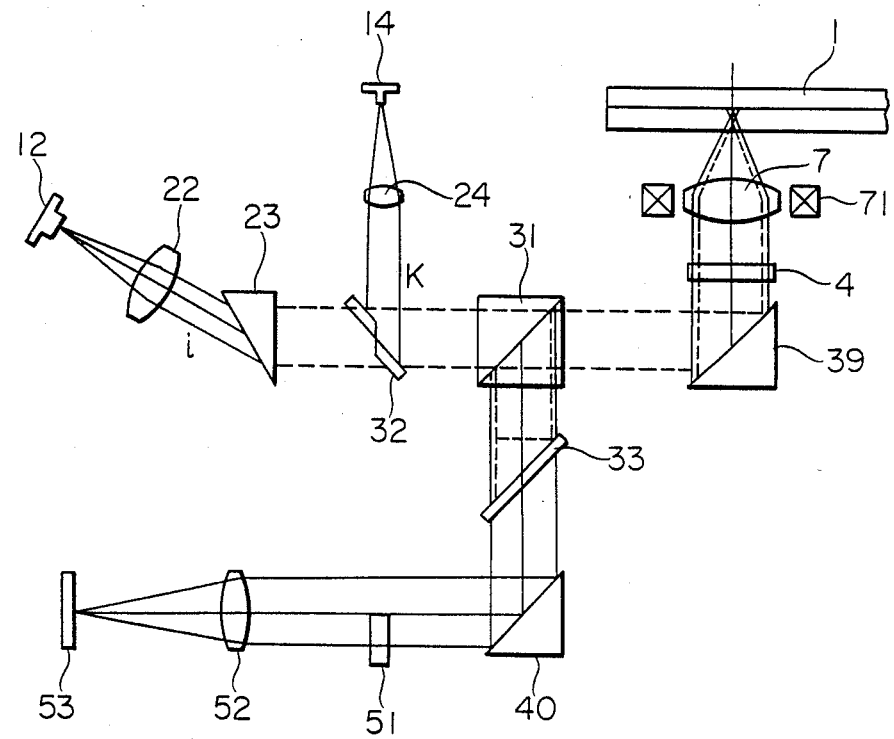
FIG. 8 is a schematic diagram illustrating another embodiment of the present invention.

FIG. 8 is a schematic diagram illustrating another embodiment implemented by removing the light detecting system related to the light detector 63 of FIG. 3 in which the electric circuit system is omitted. In this case, the servo signals for the focusing and tracking operations cannot be obtained by use of the beam k, only the light detector 53 for the beam i is utilized. In this configuration, for the recording in which the spot diameter of the beam i is reduced, the focusing and tracking operations can be accomplished with a high accuracy as described above; however, for the erasing in which the spot diameter of the beam i is enlarged, an offset must be supplied to the focus error signal, and hence the accuracy is slightly lowered. In the erasing operation, however, even if the spot is slightly defocused, a practical problem is not caused.

As described above, according to the present invention, a recording pit is preheated for the recording by the preceding beam spot k to a temperature not exceeding a temperature $T_1$ associated with a phase change, and the succeeding beam spot i is radiated onto the pit according to the signals to be recorded so as to heat the pit to a temperature not below $T_1$, which leads to an effect that a high-density recording is achieved at a high speed by use of a beam diameter focused to an extent near the diffraction limit.

What is claimed is:

1. An optical recording apparatus comprising:
an optical recording medium in which a portion thereof irradiated by a light spot to be heated to a temperature exceeding a first temperature higher than room temperature develops a first phase structure when the heated portion is cooled down thereafter and the portion irradiated by a light spot to be heated to a temperature between the first temperature and a second temperature exceeding the room temperature and not exceeding the first temperature develops a second phase structure when the heated portion is cooled down thereafter, whereby information is recorded by corresponding one of the first and second phase structures to a state that information has been recorded and by corresponding the other one thereof to a state that information has been erased;
optical means for focusing two light beams to form two light spots having different degrees of focus and for positioning the two light spots on said optical recording medium and along a recording track thereof to be radiated as a preceding spot and a succeeding spot located in the vicinity of the preceding spot;
information means for providing information for recording on said optical recording medium;
first adjust means for adjusting said optical means so that the degree of focus of the preceding spot is set to a level to preheat a portion of said optical recording medium irradiated with the preceding spot to a temperature not exceeding the first temperature and the degree of focus of the succeeding spot is set to a level to be higher than the degree of focus of the preceding spot to heat the preheated portion to a temperature exceeding the first temperature such that when said preheated portion is irradiated with said succeeding spot in accordance with said information from said information means, said information is recorded by setting said preheated portion to said first phase structure; and
second adjust means for adjusting said optical means so that the degree of focus of the preceding spot is set to a level to heat the portion of the optical recording medium to a temperature between the first temperature and the second temperature and the degree of focus of the succeeding spot is set to a level lower than the degree of focus of the preceding spot to hold the heated portion to a temperature between the first temperature and the second temperature so as to enable erasing of said optical recording medium.

2. An optical recording apparatus according to claim 1, wherein said first adjust means includes:
preceding spot adjust means for adjusting the preceding spot to be continuously radiated onto said optical recording medium
succeeding spot adjust means for radiating the succeeding spot onto at least a part of the preheated portion to heat a record portion according to information to be recorded.

3. An optical recording apparatus according to claim 1, wherein said first adjust means comprises:
preceding spot adjust means for adjusting an intensity of the preceding spot to be continuously radiated onto said optical recording medium so as to heat the portion to a temperature between the first temperature and the second temperature, thereby erasing information recorded on the heated portion and preheating the portion to be irradiated; and
succeeding spot adjust means for radiating the succeeding spot onto at least a part of the erased and preheated portion to heat the record portion according to the information to be recorded to a temperature exceeding the first temperature.

4. An optical recording apparatus according to claim 1 wherein said optical means includes:
a first light source for the preceding spot;
a second light source for the succeeding spot; and
means for radiating lights from said light sources as the preceding spot and as the succeeding spot onto said optical recording medium.

5. An optical recording apparatus according to claim 3, wherein said preceding spot adjust means is means for adjusting a power supplied to said first light source, thereby adjusting an amount of light emitted from said first light source, and said succeeding spot adjust means is means for adjusting a power supplied to said second light source, thereby adjusting an amount of light emitted from said second light source.

6. An optical recording apparatus according to claim 1 wherein said first adjust means includes means for setting a size of the preceding spot to a dimension greater than a dimension of a size of the succeeding spot.

7. An optical recording apparatus according to claim 6 wherein said first adjust means includes means for defocusing the preceding spot and for focusing the succeeding spot.

8. An optical recording apparatus according to claim 1 wherein said second adjust means includes means for setting a size of the preceding spot to a dimension smaller than a dimension of a size of the succeeding spot.

9. An optical recording apparatus according to claim 8, wherein said second adjust means includes means for focusing the preceding spot and for defocusing the succeeding spot.

10. An optical recording apparatus according to claim 1, wherein said first adjust means includes means for adjusting said optical means to a first position in relation to said optical recording medium so that the preceding spot is defocused and the succeeding spot is focused on said optical recording medium, and said second adjust means includes means for adjusting said optical means to a second position in relation to said optical recording medium so that the preceding spot is focused and the succeeding spot is defocused on said optical recording medium.

11. An optical recording apparatus according to claim 1, wherein said optical means includes:
a first light source for the preceding spot;
a second light source for the succeeding spot;
means for forming two light beams from the light of the first and second light sources so that one of said two light beams is slightly divergent in comparison with the other of said two light beam; and
means for selectively focusing one of the two light beams with the higher degree of focus.

12. An optical recording method for an optical recording medium in which a portion thereof irradiated by a light spot to be heated to a temperature exceeding a first temperature higher than room temperature develops a first phase structure when the heated portion is cooled down thereafter and the portion irradiated by a light spot to be heated to a temperature between the first temperature and a second temperature exceeding room temperature and not exceeding the first temperature develops a second phase structure when the heated portion is cooled down thereafter, whereby information is recorded by corresponding one of the first and second phase structure to a state that information has been recorded and by corresponding the other one thereof to a state that information has been erased, comprising the steps of:
focusing two light beams with optical means to form two light spots having different degrees of focus and positioning the two light spots on the optical recording medium and along a recording track thereof to be radiated as a preceding spot and a succeeding spot located in the vicinity of the preceding spot;
providing information for recording on the optical recording medium;
firstly adjusting the optical means so that the degree of focus of the preceding spot is set to a level to preheat a portion of the optical recording medium irradiated with the preceding spot to a temperature not exceeding the first temperature and the degree of focus of the succeeding spot is set to a level to be higher than the degree of focus of the preceding spot to heat the preheating portion to a temperature exceeding the first temperature such that when the preheated portion is irradiated with the succeeding spot in accordance with the information to be recorded, the information is recorded by setting the preheated portion to the first phase structure; and
secondly adjusting the optical means so that the degree of focus of the preceding spot is set to a level to heat the portion of the optical recording medium to a temperature between the first temperature and the second temperature and the of the succeeding spot is set to a level lower than the degree of focus of the preceding spot to hold the heated portion to a temperature between the first temperature and the second temperature such that erasing of the optical recording medium is enabled and the optical recording medium is set to the second phase structure.

13. An optical recording method according to claim 12, wherein the step of firstly adjusting the optical means includes adjusting the optical means to a first position relative to the optical recording medium so that the preceding spot is defocused and the succeeding spot is focused on the optical recording medium, and the step of secondly adjusting the optical means includes adjusting the optical means to a second position relative to the optical recording medium so that the preceding spot is focused and the succeeding spot is defocused on the optical recording medium.

* * * * *